Nov. 7, 1950

R. W. WALLACE ET AL 2,529,465

MULTIPLE GRAIN ROCKET FOR PROPELLING UNDERWATER TORPEDOES

Filed Aug. 2, 1946

INVENTORS
ROGER W. WALLACE
WILLIAM E. COLBURN

BY *M. O. Hayes*

ATTORNEY

Nov. 7, 1950   R. W. WALLACE ET AL   2,529,465
MULTIPLE GRAIN ROCKET FOR PROPELLING
UNDERWATER TORPEDOES
Filed Aug. 2, 1946                          2 Sheets-Sheet 2
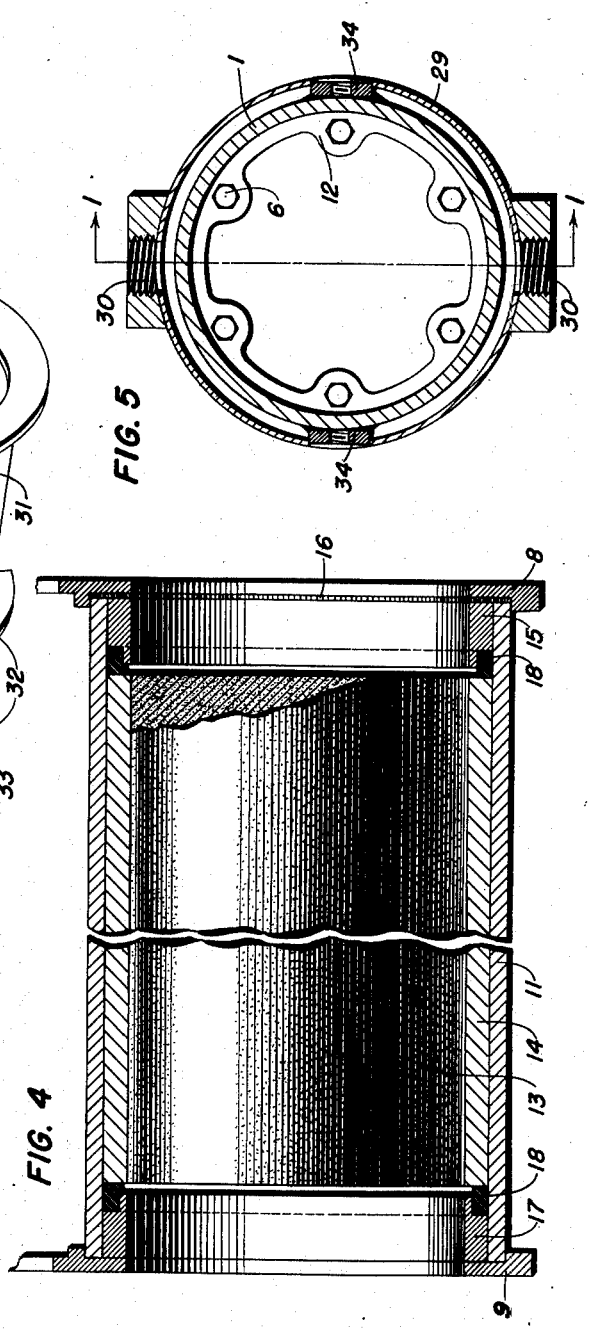
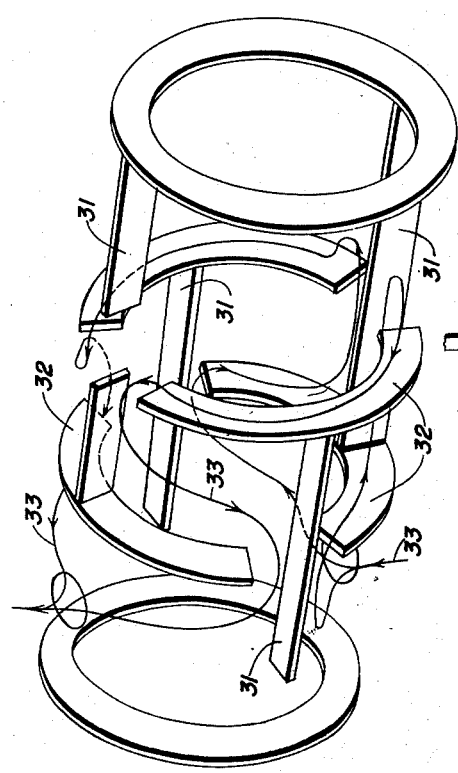
INVENTORS
ROGER W. WALLACE
WILLIAM E. COLBURN
BY
ATTORNEY Patented Nov. 7, 1950

2,529,465

UNITED STATES PATENT OFFICE 2,529,465

MULTIPLE GRAIN ROCKET FOR PROPELLING UNDERWATER TORPEDOES

Roger W. Wallace, San Marino, and William E. Colburn, Inyokern, Calif., assignors to the United States of America as represented by the Secretary of the Navy Application August 2, 1946, Serial No. 688,121

12 Claims. (Cl. 60—35.6)

The present invention relates generally to rocket motors and more specifically to a rocket motor adapted to be mounted in the after body of a torpedo in place of the conventional torpedo turbine.

An object of the invention is to provide a rocket motor of simple and rugged construction, particularly suited for aircraft-launched, water-borne torpedoes, which is inherently capable of withstanding high deceleration stresses occasioned by the torpedo striking the water at high velocity.

Another object of the invention is to provide a rocket motor which employs as its propellant a comparatively fast burning explosive such as "ballistite" and is so designed that a large quantity of such propellant may be employed with comparative safety.

Another object of the invention is to provide a rocket motor having a novel mounting arrangement for the propellant which in conjunction with simple but effective means of inhibiting certain surfaces of the propellant grain, insures "neutral" or uniform burning thereof for a substantial period.

A still further object of the invention is to provide a rocket motor wherein the rocket housing, the discharge tube and nozzle are surrounded by water jackets.

With the above and other objects, as may appear hereinafter, in view, reference is made to the accompanying drawings in which:

Fig. 4 is an enlarged longitudinal sectional view of one of the propellant grain assemblies.

Fig. 5 is a sectional view taken on line 5—5 of Fig. 1.

Fig. 6 is a perspective view of the system of baffles in the water jacket surrounding the rocket housing.

Figure 1:
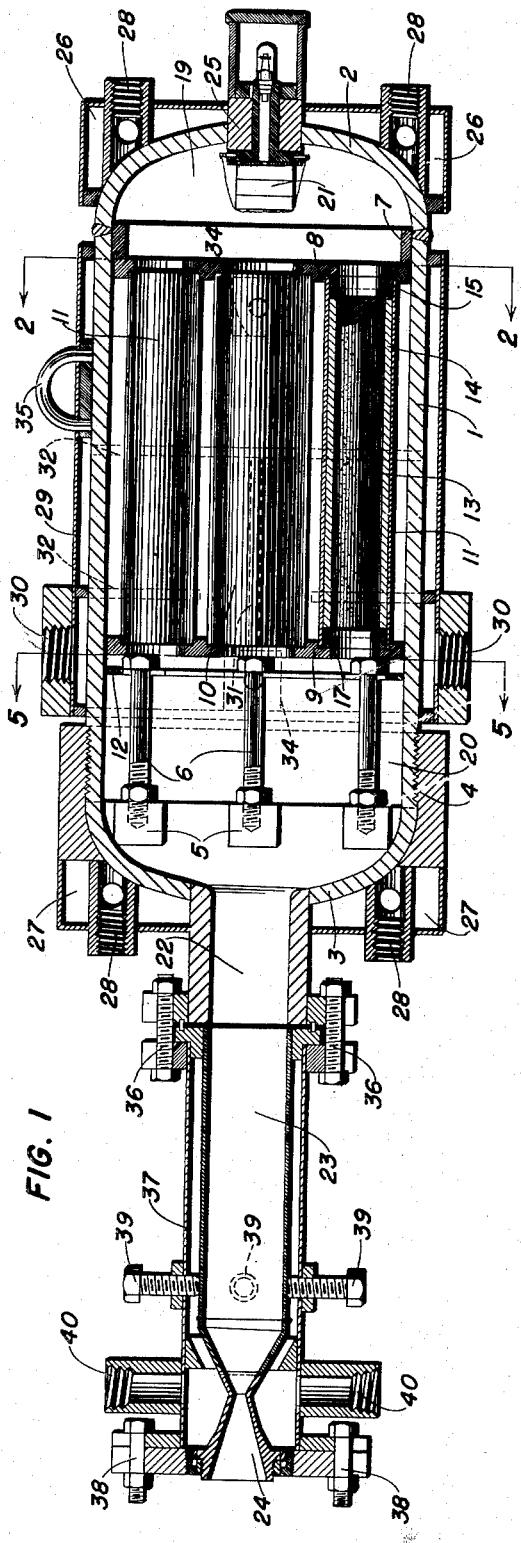
Fig. 1 is a longitudinal sectional view of a rocket motor embodying the invention, taken on line 1—1 of Fig. 5.
Figure 2:
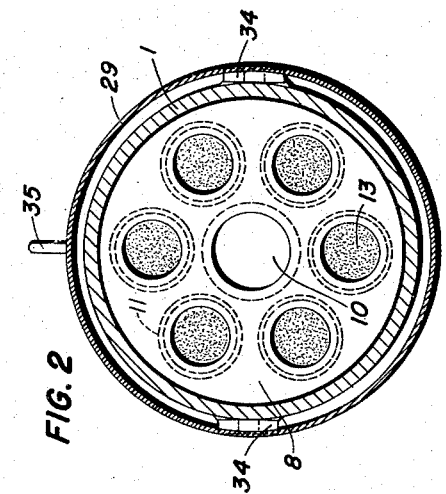
Fig. 2 is a sectional view taken on line 2—2 of Fig. 1.
Figure 3:
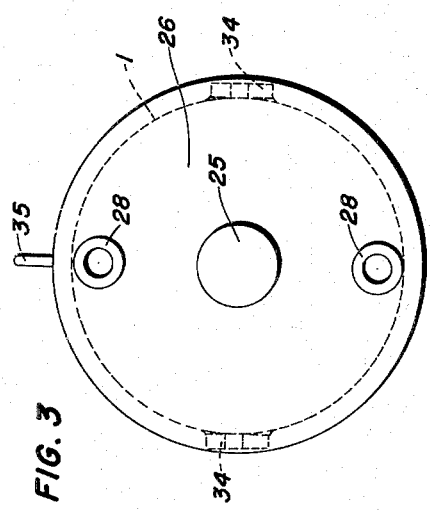
Fig. 3 is a forward end view of the rocket motor.

The rocket motor herein described and illustrated is intended to be mounted in the after body of a torpedo in place of the conventional torpedo turbine and associated mechanism. It is contemplated that parts of the rocket motor, illustrated in the drawings, will require modification to fit within the streamlined form of the particular torpedo in which it will be mounted, but internally the motor will be essentially the same as the construction shown in the drawings. It is understood, too, that the use of the rocket motor herein described is not limited to torpedoes; the motor will have application to all such devices which require a rocket motor of simple and rugged construction and especially where high deceleration stresses may be encountered during the period of operation of such devices.

The rocket motor housing comprises a heavy-walled cylindrical shell 1 closed at its forward end by a dome-shaped end member 2 which is welded, or secured by equivalent means, to the shell. The rearward end of the shell is closed by a dome-shaped end member 3 which is made integral with the shell 1 by means of the collar threaded to the shell at 4. The rear end member 3 is provided with internal bosses 5 which support spacer bolts 6 extending into the shell 1 adjacent to its inner surface. A spacer ring 12 having openings therein to receive the bolt shanks provides lateral support for the bolts. An internal flange 7 is provided at the forward end of the shell 1. Between the spacer bolts 6 and the flange 7 is positioned a propellant grain supporting frame comprising a forward bulkhead 8 and a rear bulkhead 9; these are separated by a central spacer tube 10. Each bulkhead is provided with a central opening communicating with the spacer tube 10 and in addition is provided with large peripheral openings surrounding the central opening. These peripheral openings are shown as six in number and communicate with propellant grain sleeves 11 which are held between the bulkheads 8 and 9 in the same manner as the central spacer tube 10.

Each propellant grain sleeve receives a single propellant grain 13, the cylindrical surface of which is provided with an inhibitor covering 14. For example, the propellant grain may be extruded "ballistite" and the inhibitor covering a wrapping or casing formed of cellulose acetate suitably bonded or cemented to the cylindrical surface of the propellant grain. A retainer ring 15 is secured in one end of the sleeve 11 as by the weld 16 which is machined flat so that the sleeve may bear uniformly in a countersink provided about each of the openings in the forward bulkhead 8. A slidable retainer ring 17 in the other end of the sleeve cooperates with the ring 15 to position the propellant grain in the sleeve. Gaskets 18 are provided between the retainer rings and the propellant grain.

As noted in Fig. 1 the forward bulkhead 8 rests on the fixed internal flange 7. The rear bulkhead 9, also countersunk, cooperates with the forward bulkhead 8 to secure the propellant grain sleeves 11 in place and, in addition, serves to hold the slidable retainer rings 17 in the sleeves 11 to secure the propellant grains 13 therein. After the spacer bolts 6 have been properly adjusted, assembly of the rear end member 3 on the cylindrical shell 1 causes the ends of the spacer bolts 6 to bear against the bulkhead 9 and thus serves not only to close the motor housing, but, in addition, to immovably position the motor frame, tubes and associated propellant grains within the housing.

The propellant grain 13 with its inhibitor covering 14 fits tightly within its sleeve 11. The ends of the propellant grain are uninhibited so that both ends of the propellant grain can burn. The forward bulkhead 8, including the forward ends of the propellant grains, and the forward end member 2 define a forward combustion chamber 19. Similarly, the rear end member 3, the rear bulkhead 9 and the corresponding rear ends of the propellant grains define a rear combustion chamber 20. The forward combustion chamber is provided with an igniter 21 which is wired on the closure plug 25; various means, old in the art, may be employed to set off the igniter charge. The igniter is aligned with the central spacer tube 10 so that a portion of the ignition flame readily travels to the rear combustion chamber causing ignition of both ends of the propellant grains virtually simultaneously. The products of combustion from the forward combustion chamber 19 pass rearwardly through the central tube 10 and the products of combustion from both chambers are discharged through a discharge port 22 in the rear end member 3. The discharge port 22 communicates with a discharge tube 23 terminating in a nozzle 24.

Both the rocket motor housing as well as the discharge tube are surrounded by water jackets. Individual water jackets 26 and 27 are provided, respectively, at the forward and rear ends of the housing. Each is equipped with two internally threaded ports 28, one serving as an inlet the other as an outlet. A third water jacket 29 girdles the central body of the rocket motor; internally threaded inlet and outlet ports 30 are similarly provided as well as a system of longitudinal and circular baffles, 31 and 32 respectively, which cooperate to direct the water in a circuitous path 33 within the jacket, as illustrated in Fig. 6. Tapped suspension pads 34 are positioned between the cylindrical shell 1 of the rocket motor housing and the outer wall of the central water jacket 29. These pads lend greater rigidity to the water jacket structure, cooperate with the baffles 31 and 32 to divert the water in the jacket through the circuitous path described above, and provide suspension means by which the rocket motor may be mounted in the torpedo body. A lift loop 35 is also provided to facilitate handling of the rocket motor.

The discharge tube 23 is secured to the discharge port 22 by the bolts 36 and terminates in the nozzle 24. Both the discharge tube and nozzle are surrounded by the water jacket 37. The after end of the nozzle structure is secured to the after end of the water jacket wall by the bolts 38. Positioning bolts 39 support and align the discharge tube 23 properly within the water jacket. Two internally threaded ports 40 communicate with the water jacket to serve as inlet and outlet ports.

When the present invention is employed in aircraft-launched, water-borne torpedoes, suitable means can be provided to initiate operation of the rocket motor when the torpedo strikes the water. By reason of the fact that the propellant grains are inhibited, except for their two ends, their burning areas remain constant throughout the burning period. This insures uniform or "neutral" burning which is particularly desirable in rocket motors in order to avoid "blowups" or erratic operation or otherwise causing departures from predictable operation. Because of the fact that combustion takes place at both ends of the propellant grain, the propellant grain is not subjected to any appreciable pressure differential between its ends and, therefore, is not caused to move from its sleeve during the course of its burning. Also, because the ends only of the propellant grain burn, it is possible to use an otherwise fast burning propellant such as "ballistite" in a rocket motor which will function for several minutes. Still further, it has been found possible with the construction illustrated to employ a larger quantity of propellant than has been heretofore generally used.

From the foregoing description it will be seen that we have provided simple and rugged means for accomplishing all of the objects of the present invention. It will be understood that many changes may be made in the arrangement and details of parts described without departing from the spirit of the invention as set forth in the accompanying claims. We, therefore, do not wish to be limited to the exact details shown and described as the preferred form only has been shown by way of illustration.

We claim:

1. A rocket motor comprising: a housing; a discharge tube and nozzle leading from said housing; a propellant grain supporting frame in said housing defining therewith a forward and a rear combustion chamber, said frame including a forward bulkhead and a rear bulkhead; tubes extending between the said bulkheads, at least one of said tubes defining a passageway between said combustion chambers; and propellant grains in the remainder of said tubes.

2. A rocket motor comprising: a housing; a discharge tube and nozzle leading from said housing; a propellant grain supporting frame in said housing defining therewith a forward and a rear combustion chamber, said frame including a forward bulkhead and a rear bulkhead; tubes extending between said bulkheads, at least one of said tubes defining a passageway between said combustion chambers; and propellant grains in the remainder of said tubes, said propellant grains being inhibited except at their end surfaces which face said combustion chambers.

3. A rocket motor comprising: a housing; a propellant grain supporting frame positioned in said housing to define a forward and a rear combustion chamber, said frame including a forward bulkhead and a rear bulkhead; tubes extending between said bulkheads, at least one of said tubes defining a passageway between said combustion chambers; solid propellant grains fitted in the remainder of said tubes, their axial ends only being exposed to the combustion chambers; a discharge tube and nozzle leading from the rear combustion chamber; and an igniter in one of said combustion chambers.

4. A rocket motor comprising: a housing; a propellant grain supporting frame positioned in said housing to define a forward and a rear combustion chamber, said frame including a forward bulkhead and a rear bulkhead; tubes extending between said bulkheads at least one of said tubes defining a passageway between said combustion chambers; solid propellant grains fitted in the remainder of said tubes, said propellant grains being inhibited against burning except at their axial ends, which ends are exposed to the combustion chambers; a discharge tube and nozzle leading from the rear combustion chamber; and an igniter in one of said combustion chambers approximately aligned with said tube which defines a passageway between the combustion chambers.

5. A rocket motor comprising: a housing; a propellant grain supporting frame positioned in said housing to define a forward and a rear combustion chamber; tubes mounted in said supporting frame and extending between said combustion chambers, one of said tubes being centrally positioned and forming a passageway between the combustion chambers, the other tubes surrounding said central tube; solid cylindrical propellant grains having their cylindrical surfaces inhibited against burning and their axial extremities uninhibited, each of said grains fitting into one of said other tubes; a discharge tube and nozzle leading from the rear combustion chamber; and an igniter positioned in the forward combustion chamber and approximately aligned with said central tube.

6. A rocket motor comprising: a housing; a propellant grain supporting frame positioned in said housing to define a forward and a rear combustion chamber, said frame including a forward bulkhead and a rear bulkhead; tubes extending between said bulkheads, one of said tubes being centrally positioned and forming a passageway between said combustion chambers, the other tubes surrounding said central tube; solid cylindrical propellant grains having their cylindrical surfaces inhibited against burning and their axial extremities uninhibited, each of said grains fitting into one of said other tubes; a discharge tube and nozzle leading from the rear combustion chamber; and an igniter positioned in the forward combustion chamber and approximately aligned with said central tube.

7. A rocket motor comprising: a housing; a propellant grain supporting frame positioned in said housing to define a forward and a rear combustion chamber; tubes mounted in said supporting frame and extending between said combustion chambers, at least one of said tubes defining a passageway between the combustion chambers; solid propellant grains fitted in the remainder of the tubes, their axial ends only being exposed to the combustion chambers; a discharge tube and nozzle leading from the rear combustion chamber; a water jacket surrounding said discharge tube and nozzle; and an igniter in one of said combustion chambers.

8. A rocket motor comprising: a housing; a propellant grain supporting frame positioned in said housing to define a forward and a rear combustion chamber; water jackets surrounding said combustion chambers; tubes mounted in said supporting frame and extending between said combustion chambers, at least one of said tubes defining a passageway between the combustion chambers; solid propellant grains fitted in the remainder of the tubes, their axial ends only being exposed to the combustion chambers; a discharge tube and nozzle leading from the rear combustion chamber; and an igniter in one of said combustion chambers.

9. A rocket motor comprising: a housing; a water jacket surrounding said housing; a propellant grain supporting frame positioned in said housing to define a forward and a rear combustion chamber, said frame including a forward bulkhead and a rear bulkhead; tubes extending between said bulkheads, at least one of said tubes defining a passageway between said combustion chambers; solid propellant grains fitted in the remainder of the tubes, their axial ends only being exposed to the combustion chambers; a discharge tube and nozzle leading from the rear combustion chamber; a water jacket surrounding said discharge tube and nozzle; and an igniter in one of said combustion chambers.

10. A rocket motor comprising: a housing; a propellant grain supporting frame positioned in said housing to define a forward and a rear combustion chamber, said frame including a forward bulkhead and a rear bulkhead; tubes extending between said bulkheads, at least one of said tubes defining a passageway between said combustion chambers; solid cylindrical propellant grains fitted in the remainder of the tubes, said propellant grains having their cylindrical surfaces inhibited against burning and their axial extremities uninhibited; a discharge tube and nozzle leading from the rear combustion chamber; a water jacket surrounding said discharge tube and nozzle; and an igniter in one of said combustion chambers approximately aligned with said tube which defines a passageway between the combustion chambers.

11. A rocket motor comprising: a housing; a propellant grain supporting frame positioned in said housing to define a forward and a rear combustion chamber, said frame including a forward bulkhead and a rear bulkhead; tubes extending between said bulkheads, at least one of said tubes defining a passageway between said combustion chambers; solid cylindrical propellant grains fitted in the remainder of the tubes, said propellant grains having their cylindrical surfaces inhibited against burning and their axial extremities uninhibited; water jackets surrounding said combustion chambers; a discharge tube and nozzle leading from the rear combustion chamber; and an igniter in one of said combustion chambers approximately aligned with said tube which defines a passageway between the combustion chambers.

12. A rocket motor comprising: a housing; a water jacket surrounding said housing; a propellant grain supporting frame positioned in said housing to define a forward and a rear combustion chamber, said frame including a forward bulkhead and a rear bulkhead; tubes extending between said bulkheads, one of said tubes being centrally positioned and forming a passageway between said combustion chambers, the other tubes surrounding said central tube; solid cylindrical propellant grains having their cylindrical surfaces inhibited against burning and their axial extremities uninhibited, each of said grains fitting into one of said other tubes; a discharge tube and nozzle leading from the rear combustion chamber; a water jacket surrounding said discharge tube and nozzle; and an igniter positioned in the forward combustion chamber and approximately aligned with said central tube.

ROGER W. WALLACE.
WILLIAM E. COLBURN.

No references cited.